Nov. 23, 1937. L. STERLING 2,100,040
COIL SPRING TRAILER
Filed Aug. 1, 1936
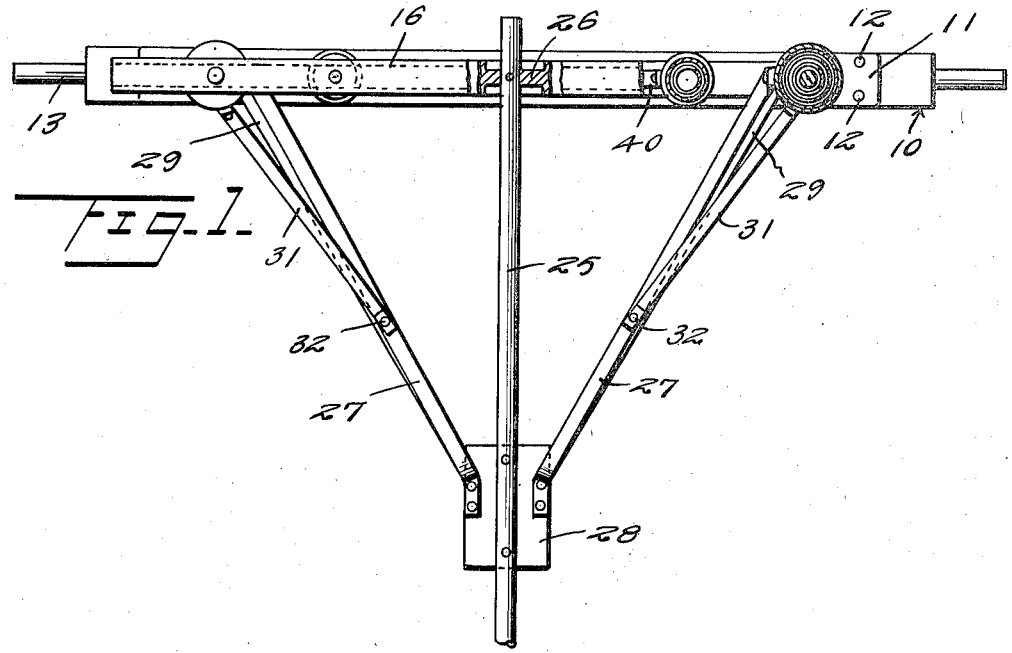
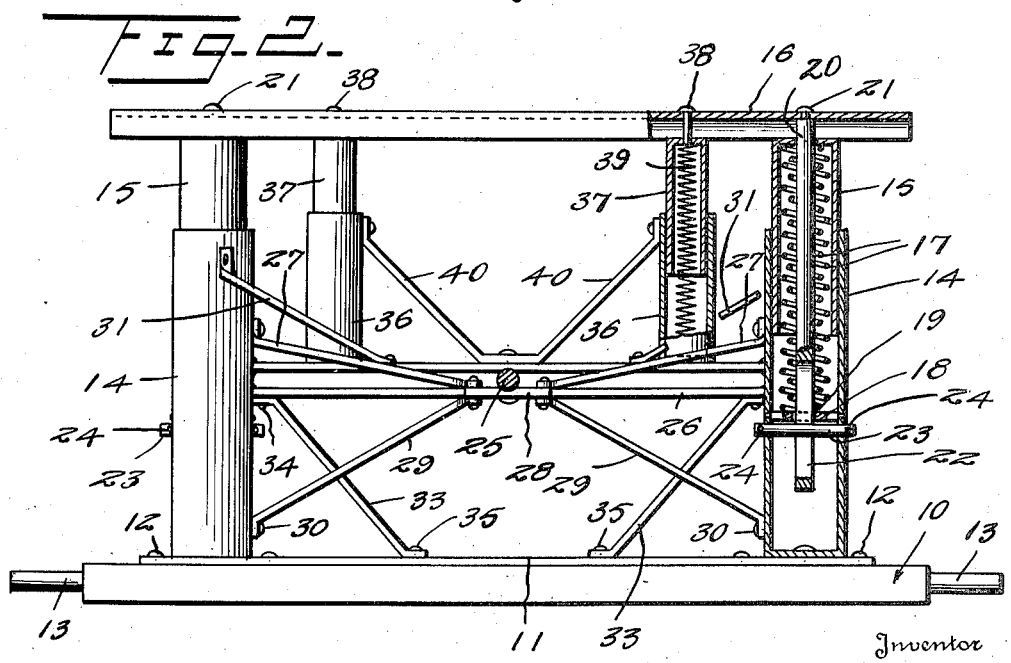
Inventor
L. Sterling
By Watson E. Coleman
Attorney Patented Nov. 23, 1937

2,100,040

UNITED STATES PATENT OFFICE 2,100,040

COIL SPRING TRAILER

Leonard Sterling, Newton, Tex.

Application August 1, 1936, Serial No. 93,894

1 Claim. (Cl. 280—106.5)

This invention relates to trailer constructions and more particularly to an improved trailer frame for supporting a trailer body.

An object of this invention is to provide an improved cushioned frame which may be mounted on suitable wheels and connect to a vehicle by means of a draw bar with the cushioning means so constructed as to take care of any overloads to which the body and frame may be subjected.

Another object of this invention is to provide an improved trailer frame which is of simple construction and which will adequately support a trailer body so that the body may have movement relative to the axle.

With the foregoing and other objects in view, the invention will be more fully described hereinafter, and will be more particularly pointed out in the claim appended hereto.

In the drawing wherein like symbols refer to like or corresponding parts throughout the several views, Figure 1 is a detail top plan partly broken away and in section of a trailer frame constructed according to an embodiment of this invention.

Figure 2 is a detail front elevation partly broken away and in section of the frame.

Referring to the drawing, the numeral 10 designates generally an axle provided at the opposite ends thereof with spindles 13 on which wheels may be mounted. An elongated plate 11 is secured to the upper side of the axle 10 by means of bolts or other fastening devices 12 and a pair of tubular guide members 14 are mounted in upstanding relation on top of the plate or bar 11, one adjacent each end thereof. These tubular members are open at the top and a pair of tubular slide members 15 slidably engage within the lower tubular members 14. The slide members 15 are secured at the upper ends thereof to a channel frame bar 16, which is disposed in parallel relation to the axle 10.

The frame structure comprising the channel member 16 and the slide members 15 is cushioned with respect to the axle 10 by means of a pair of concentric coil springs 17 which are disposed within the slide member 15 and extend downwardly into the guide member 14. The upper ends of the springs 17 engage against the upper ends of the slide members 15 and the lower ends thereof engage against a stop member or abutment 18 which is secured to the guide member 14 at a point upwardly from the lower end thereof. The abutment 18 is provided with an axial opening 19 through which an elongated bar 20 loosely engages. This bar 20 has the upper end thereof secured, as at 21, to the channel member 10 and is provided adjacent the lower end thereof with an elongated slot 22 through which a pin 23 engages. The pin 23 extends diametrically across the guide member 14 and is held against movement by means of cotter pins 24 or the like.

The pin 23 acts to prevent pulling out of the slide member 15 under any stress to which the frame may be subjected.

A draw bar 25 has its inner end secured to a cross beam 26 which is substantially of I-construction, and the opposite ends of the I-beam 26 are secured as by welding or the like to the upstanding guide members 14 which point upwardly from the lower ends thereof, as shown in Figure 2. The draw bar 25 is braced by means of upper braces 27 which have their inner ends secured to the guide members 14 and their outer ends secured to a plate 28 fixed to the draw bar 25 forwardly of the inner end thereof. Lower braces 29 have their inner ends secured, as at 30, to the guide members 14 adjacent the lower ends thereof and the forward ends of the braces 29 are secured to the plate 28, preferably on the underside thereof, as shown in Figure 2. Additional braces 31 are secured at their inner ends to the guide members 14 adjacent the upper ends thereof and these braces 31 are secured at their forward ends to the upper braces 27, as at 32. Braces 33 are provided to additionally brace the guide members 14, the braces 33 being secured at their upper ends, as at 34, to the underside of the I-beam 26 and at their lower ends to the plate 11, as at 35.

In order to provide a means whereby to cushion any overload to which the frame structure 15—16 may be subjected, I have provided overload cushioning means in form of stationary guide members 36, which are secured in spaced apart relation to the upper side of the I-beam 26 closely adjacent the guide members 14 and slide members 37 which telescope the guide members 36 and are secured at their upper ends to the underside of the channel member 16 by means of securing rivets or bolts 38.

An overload spring 39 is disposed within the guide member 36 and extends upwardly into the silde member 37 and is an expanding spring which is adapted to cooperate with the pairs of concentric springs 17 to take care of any overload or additional strains to which the frame may be subjected. The guide members 36 are braced by means of bracing members 40 which have their upper ends secured to the guide members 36 adjacent the upper ends thereof and the lower ends of the bracing members 40 are secured to the upper side of the I-beams.

In the use of this device, the draw bar 25 is adapted to be secured to a suitable connection forming a part of a vehicle and wheels are adapted to be mounted on the spindles 13. The trailer body is adapted to be mounted on the frame member 16 and when the frame member 16 moves relative to the axle 10, the movement thereof will be cushioned by means of the cushioning springs 17. At the same time, the springs 39 will be compressed, these springs 39 being provided to additionally cushion the frame member 16 with respect to the axle 10. The upward movement of the frame member 16 is limited by the length of the slot 22 and the kingpin or transverse pin 23, which is secured to each stationary guide member 14.

While I have shown the trailer frame construction as having only one pair of wheels it will be understood that, if desired, a pair of these frame members may be used where the trailer body is sufficiently large to require such additional support.

It is, of course, understood that various changes and modifications may be made in the details of construction and design of the above specifically described embodiment of this invention without departing from the spirit thereof, such changes and modifications being restricted only by the scope of the following claim.

I claim:—

A trailer comprising upper and lower horizontal frame bars, a lower pair of tubular guide members secured to said lower bar, a second pair of tubular members secured to said upper bar and slidably engaging said lower tubular members, an intermediate frame bar secured at the ends thereof to said lower tubular members at a point spaced upwardly of the lower ends thereof, telescoping tubular members secured to said intermediate and said upper bar between said first named guide members, expanding springs within said tubular members, a plate in each of said lower guide members upwardly of the lower ends thereof engaging against the lower ends of said springs, a pair of elongated rods secured to said upper bar and extending axially downward in said first named upper tubular members, said rods each having an elongated opening therethrough, a pin extending transversely through each lower guide member and the opening therein to thereby limit the vertical movement of said upper bar, a draft bar, forwardly extending bracing means secured to said lower guide members and to said draft bar, and an axle secured to said lower bar.

LEONARD STERLING.